United States Patent
Heidloff et al.

(10) Patent No.: US 7,870,206 B2
(45) Date of Patent: Jan. 11, 2011

(54) METHOD, COMPUTER PROGRAM PRODUCT, AND USER INTERFACE FOR MAKING NON-SHARED LINKED DOCUMENTS IN ELECTRONIC MESSAGES ACCESSIBLE TO RECIPIENTS

(75) Inventors: Niklas Heidloff, Salzkotten (DE); Shruti Kumar, Littleton, MA (US); Michael R. O'Brien, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 11/561,136

(22) Filed: Nov. 17, 2006

(65) Prior Publication Data
US 2008/0120382 A1 May 22, 2008

(51) Int. Cl.
G06F 15/16 (2006.01)
G06F 3/01 (2006.01)

(52) U.S. Cl. .................. 709/206; 715/700; 715/752; 709/200; 709/217; 709/220

(58) Field of Classification Search .................. 709/206
See application file for complete search history.

(56) References Cited

U.S. PATENT DOCUMENTS

| | | | | |
|---|---|---|---|---|
| 5,710,883 A * | 1/1998 | Hong et al. | | 709/246 |
| 6,275,848 B1 * | 8/2001 | Arnold | | 709/206 |
| 6,687,741 B1 | 2/2004 | Ramaley et al. | | |
| 7,194,514 B1 * | 3/2007 | Yen et al. | | 709/206 |
| 7,231,426 B1 * | 6/2007 | Hall et al. | | 709/206 |
| 2002/0059384 A1 * | 5/2002 | Kaars | | 709/206 |
| 2002/0188685 A1 | 12/2002 | Bhogal et al. | | |
| 2003/0041126 A1 * | 2/2003 | Buford et al. | | 709/220 |
| 2003/0158953 A1 * | 8/2003 | Lal | | 709/230 |
| 2004/0034688 A1 | 2/2004 | Dunn | | |
| 2004/0117358 A1 * | 6/2004 | von Kaenel et al. | | 707/3 |
| 2004/0158607 A1 | 8/2004 | Coppinger et al. | | |
| 2004/0267687 A1 | 12/2004 | Aschen et al. | | |
| 2005/0108335 A1 * | 5/2005 | Naick et al. | | 709/206 |
| 2007/0130262 A1 * | 6/2007 | Williams et al. | | 709/206 |

* cited by examiner

Primary Examiner—Ashok B Patel
Assistant Examiner—Linglan Edwards
(74) Attorney, Agent, or Firm—Cantor Colburn LLP; Raymond Szeto

(57) ABSTRACT

Linked non-shared documents within email messages are made accessible to a recipient. Upon initiation of sending of an email message by a user, the MIME of the email is automatically parsed through to detect URL tags indicating that a linked document is contained within the email message. Upon detection of a URL tag, the prefix of the URL is checked to determine if it is accessible to a recipient. If the prefix indicates that the link is not accessible to the recipient, the sender is provided with at least the following options for making the linked document accessible to the recipient: sending the linked document as an in-line document by converting the document into HTML format and embedding it into a multi part MIME message, sending the linked document as an attachment with a link to a file system or document library, or converting the linked document into a pdf file and sending it as an attachment. If the prefix is set, by default, as one that is not accessible to the recipient, the option of converting the document into HTML format and embedding it into a multi part MIME message may be automatically selected.

17 Claims, 4 Drawing Sheets

FIG. 2

METHOD, COMPUTER PROGRAM PRODUCT, AND USER INTERFACE FOR MAKING NON-SHARED LINKED DOCUMENTS IN ELECTRONIC MESSAGES ACCESSIBLE TO RECIPIENTS

FIELD OF INVENTION

This application relates to processing messages, and in particular to making non-shared linked documents in electronic messages accessible to recipients.

BACKGROUND OF INVENTION

Nowadays, much business communication is done electronic messaging, such as e-mail. People send and receive enormous amounts of information as data attachments, in-line text and, more commonly, document links.

The problem with using linked documents is that if a link points to a non-shared resource/document, it becomes useless to the recipient, as the underlying information is not accessible to the recipient.

For example, user A may send an email message to User B with some document link contained in it. This document link may be a Universal Resource Locator (URL) pointing to a document from a database that is local to User A but is not accessible to User B. User B receives the email message with the link but cannot access the document since it is not in a shared location accessible by User B.

Examples of links that may be sent in an email message that aren't accessible by the recipient may include, for example, a Notes document in an email database (db) on a client or a server, a sender's file system, e.g., file://c:/readme.txt, and a link to a file/document in a personal "mydocs" library, such as Workplace Documents Library. This is not a complete list of links that may be sent that are not accessible by a recipient but are just a few examples.

Most e-mail client software, like Microsoft Outlook (Microsoft Corporation, Redmond, Wash.), and Internet/email service providers, like Yahoo, Google, and Hotmail, do not have the feature to convert a link pointing to a non-shared document to a form accessible to recipient, prior to sending the email. This results in an undesired delay in sharing the information in the document. Obviously, this becomes an important issue if the link is to a document containing time sensitive information.

Accordingly, there is a need for a technique for making a linked document contained within an email message accessible to a recipient.

SUMMARY OF INVENTION

According to exemplary embodiments, a method, computer program product, and user interface are provided for making non-shared linked documents in email messages accessible to a recipient. Upon initiation of sending of an email message by a user, the MIME of the email is automatically parsed through to detect URL tags indicating that a linked document is contained within the email message. Upon detection of a URL tag, the prefix of the URL is checked to determine if it is accessible to a recipient.

According to one embodiment, if the prefix indicates that the link is not accessible to the recipient, the sender is provided with at least the following options for making the linked document accessible to the recipient: sending the linked document as an in-line document by converting the document into HTML format and embedding it into a multi part MIME message, sending the linked document as an attachment with a link to a file system or document library, or converting the linked document into a pdf file and sending it as an attachment.

According to another embodiment, if the prefix is one that is set, by default, as not being accessible to the recipient, the option of converting the document into HTML format and embedding it into a multi part MIME message may be automatically selected.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates a special case for sending electronic messages with a linked document according to an exemplary embodiment.

The detailed description explains the exemplary embodiments of the invention, together with advantages and features, by way of example with reference to the drawings.

DETAILED DESCRIPTION OF EMBODIMENTS

According to exemplary embodiments, the above-mentioned problems of sending linked documents using existing email clients are solved by a method, computer program product, and user interface for email clients that allows the links pointing to a non-shared documents to be converted a form, which recipients can access. The user interface allows for auto-conversion options to allow the links pointing to a non-shared document to be converted to an accessible format before the email is sent. While the description contained herein focuses on email, it should be appreciated that similar techniques may be applied to other forms of electronic messages, e.g., instant messages, text messages, etc.

Figure 1:
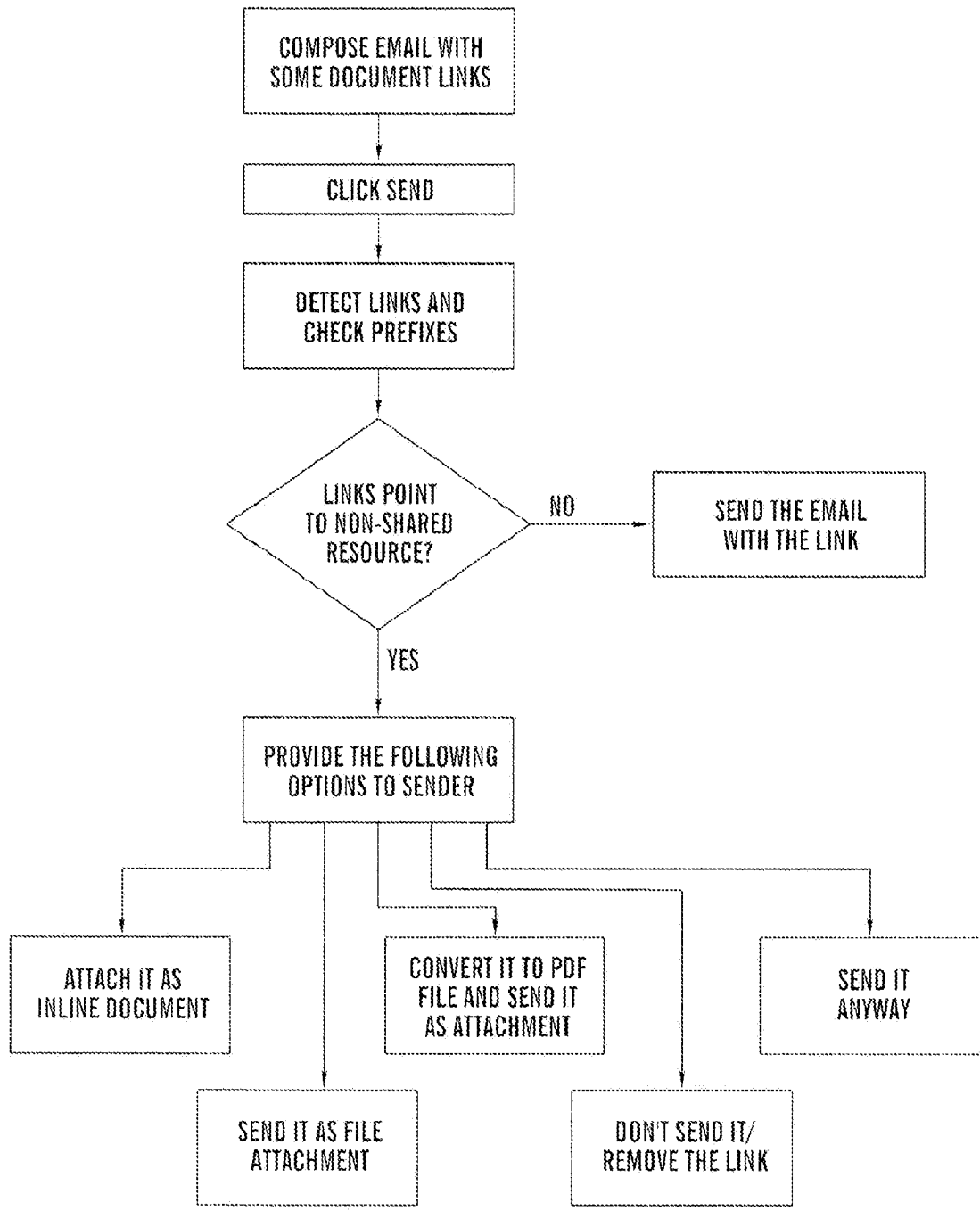
FIG. 1 illustrates a method for sending electronic messages with linked documents using various options according to an exemplary embodiment.

FIG. 1 illustrates a method for sending email messages with linked documents according to one embodiment. According to this embodiment, after a sender composes an email with linked documents and clicks "send", the sender's client device checks all the URLs in the email message, pointing to linked documents. According to one embodiment, links may be detected by parsing through the MIME of the email message for the URL tags to detect links. However, those skilled in the art will appreciate that links may also be detected using any suitable existing tool. The prefixes of the links are then checked. If the prefixes of the URLs are all associated with shared resources, such that they are accessible to the recipient, the email is sent with the links. If the prefix of at least one URL is that of a non-shared document, the client device provides a user interface to allow the sender to choose an option (see below) to convert the link to a form, which recipients can access.

According to one embodiment, a user may define the prefixes of URLs for non-shared documents. For example, the user may define the following list of prefixes as corresponding to non-shared documents:

file://
notes:///Nxxxmail.nsf
http://server.ip.address/myPrivateDocLib

The user's client device may then detect any links having these prefixes as links to non-shared documents.

It is beneficial to allow user selection for conversion of a link, rather than simply altering security settings to make all documents public, to preserve document privacy.

Referring back to FIG. 1, if a prefix of a link indicates that it points to a non-shared document, a sender is provided with various options for sending a link. As shown in FIG. 1, one option is to send the linked document as an in-line document by converting the document into a Hypertext Markup Language (HTML) format and embedding it in a multi part Multipurpose Internet Mail Extension (MIME) message. There are many existing tools and technology, which can be, used for conversion, e.g., DCS from IBM (document conversion services) or Stellent Inside Out that can convert a variety of different formats into other formats, like HTML. Conceptually, the link may be seen as being replaced with text for the user, e.g., 'link was removed because it linked to private document; please see in attachment for content . . . '. Technically, the converted document is put in either another MIME part (e.g., HTML content type) for attachments, or the MIME is modified for the inline HTML.

Another option is for the sender to send the link as a file attachment (if the link is sent to a file on a file system or doc library). Another option involves the sender converting the linked document into a pdf file and sending it as an attachment. Of course, the sender may just send the message with the linked document without making an effort to convert it. This might be useful if recipient can access email, like in a delegation use case. Also, the sender may either not send the email message containing the link or may simply remove the link.

Figure 2:
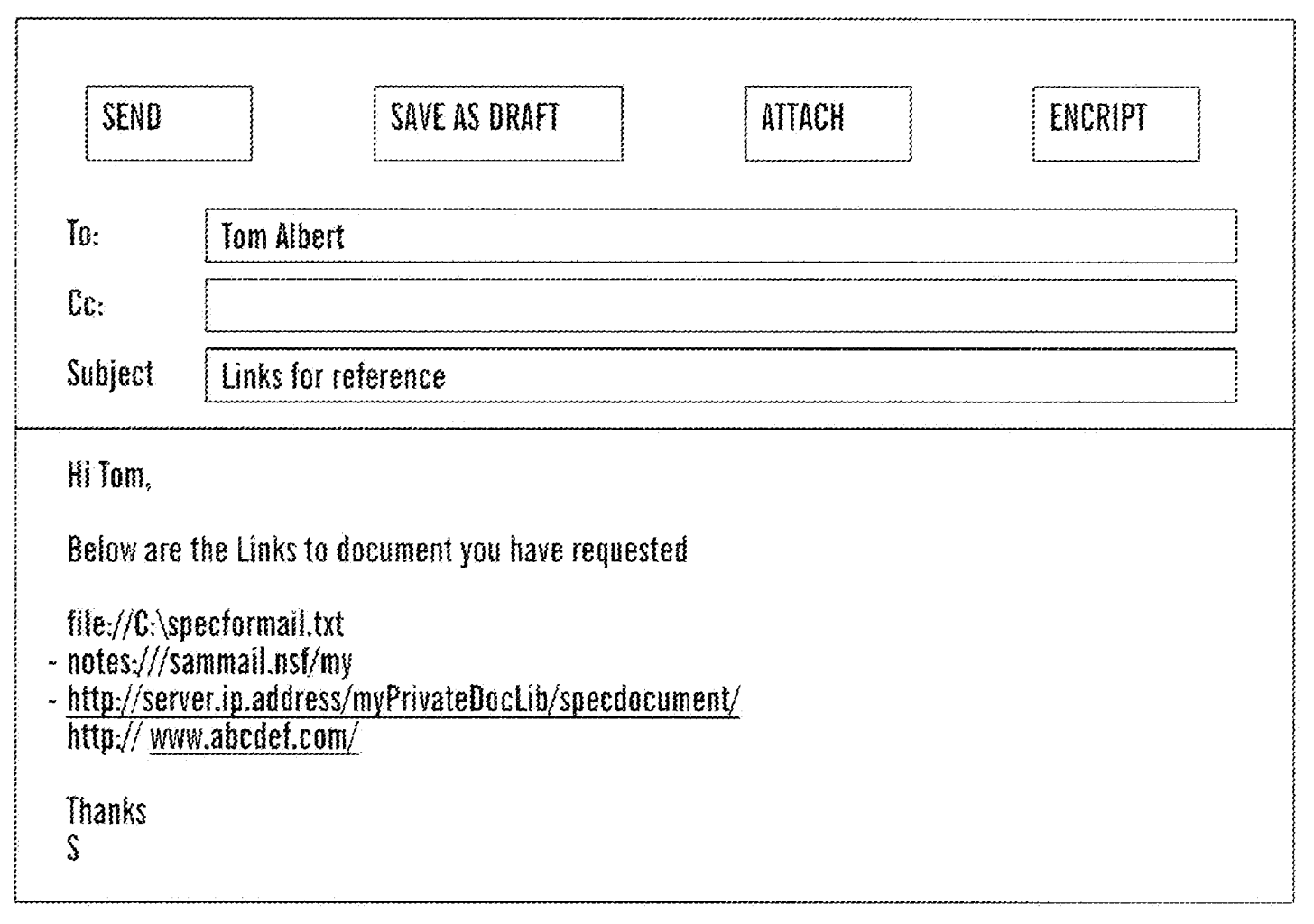
Figure 3:
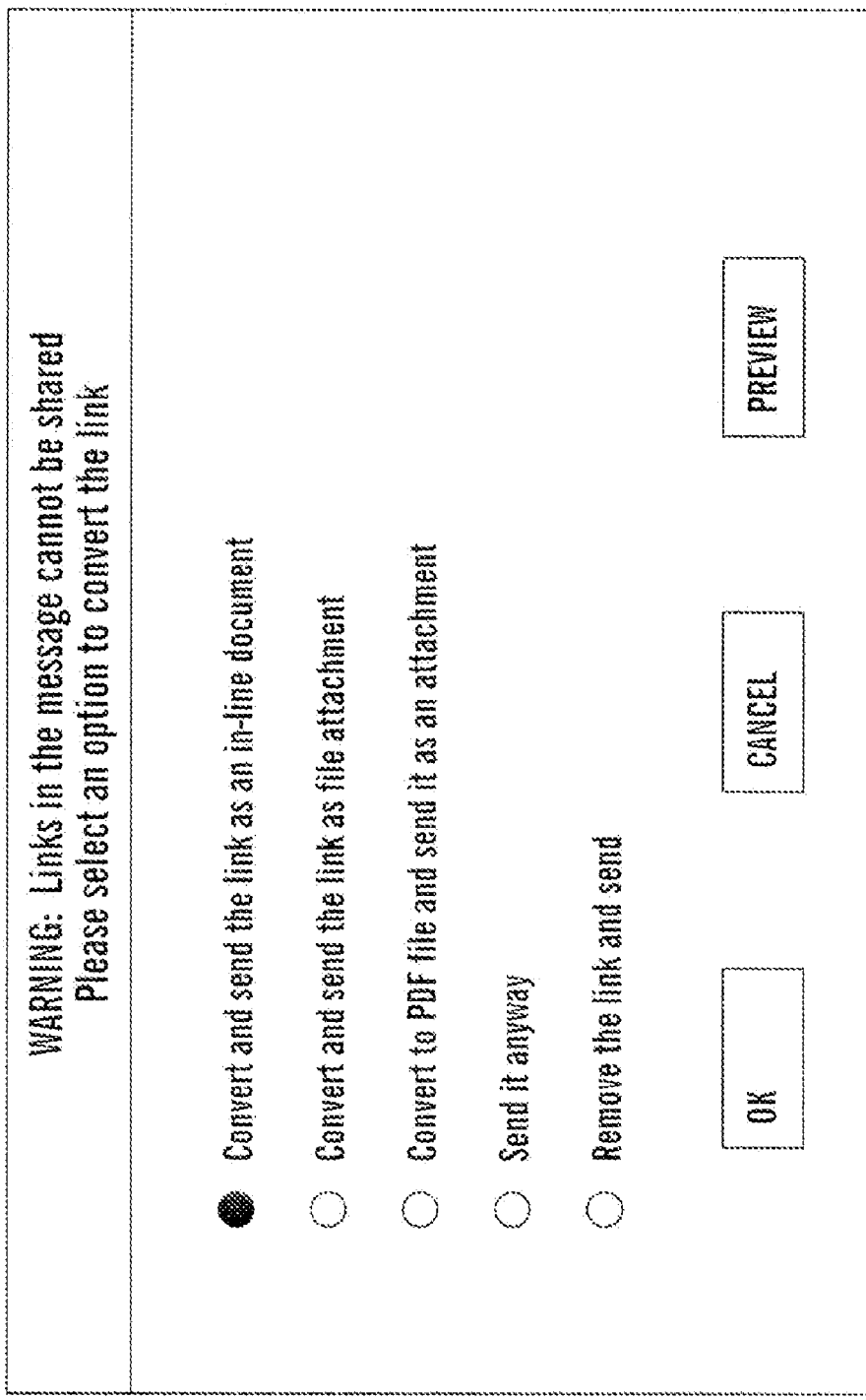
FIG. 3 illustrates a screen for composing an email with a link according to an exemplary embodiment.

For illustrative purposes, FIGS. 2 and 3 depict exemplary user interfaces that may be used to compose an email with a linked document according to an exemplary embodiment. Suppose that the user interface in FIG. 2 is presented to a sender for creating an email message. The email message contains a link to file://C:\specformail.txt. Assuming that the list of prefixes given above was defined by the user as a list of non-shared documents, the client device would detect the prefix file:// and present the screen shown in FIG. 3 to the sender. The sender could then select an option for sending the linked document, e.g., converting the document and sending the link as an in-line document. Although not illustrated, those skilled in the art will appreciate that the user interfaces shown in FIGS. 2 and 3 may be implemented on any suitable device, e.g., a personal computer or PDA.

Figure 4:
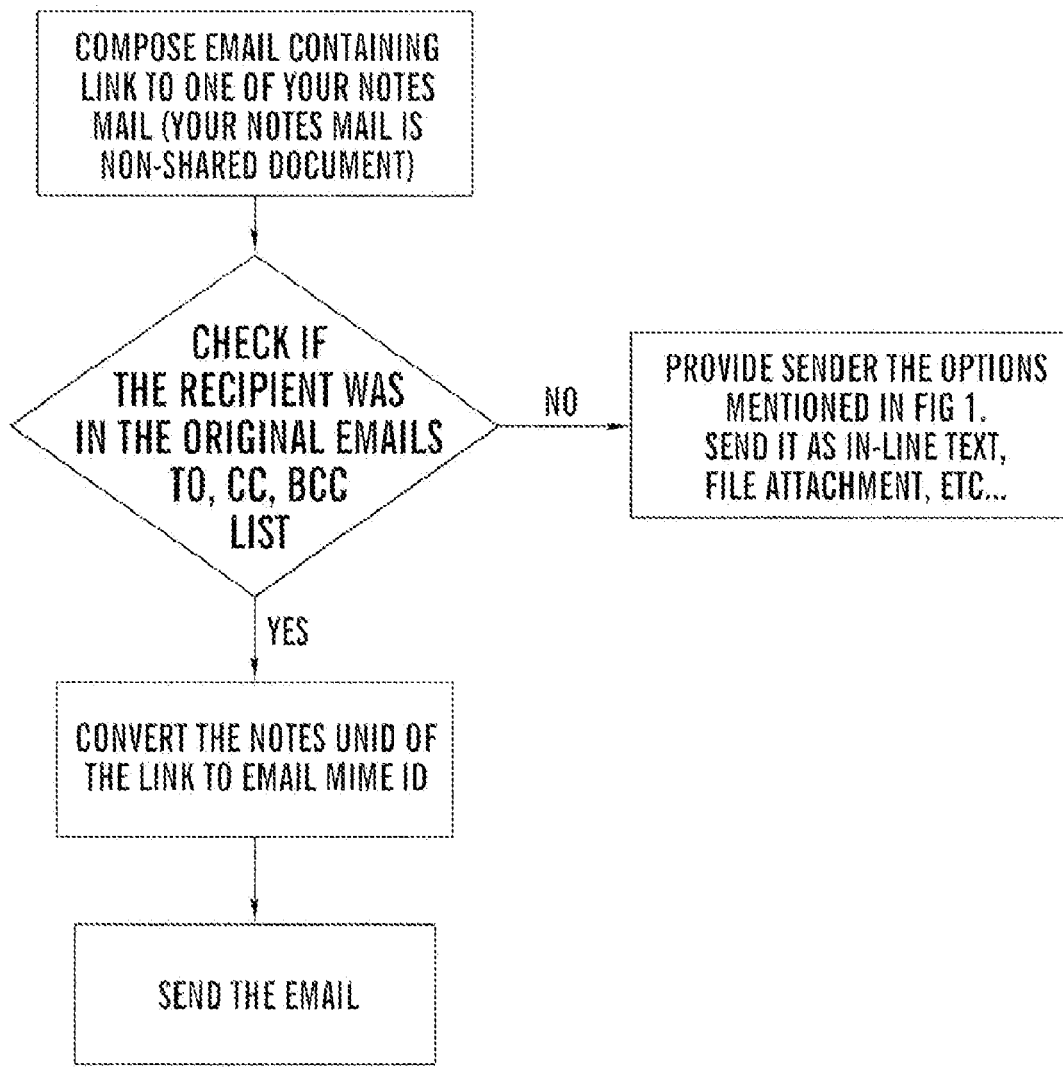
FIG. 4 illustrates a screen for selecting an option for making a non-shared linked document in an email accessible to a recipient according to an exemplary embodiment.

In a special case, the linked document may be an email that the recipient already has in his or her mailbox. In this case, depicted in FIG. 4, a sender composes an email with a link to a Notes email that is a non-shared document. A determination is made whether the recipient was an original recipient of the Notes email, e.g., whether the recipient email address was in the TO, CC or BCC field. If not, the sender is provided with the options shown in FIG. 1 for sending the email. If the recipient was an original recipient of the Notes email, the Note's universal ID (unid) of the link may be converted to the MIME id of the email. Then, the client device of the recipient can open this email message in his or her mailbox by using the MIME id of the email. This method will work for single links as well as lists of links. The only drawback is that the recipient might have deleted the original mail from his or her mailbox. In this case, the recipient will not be able to access the link, and the sender will need to use another option to make it accessible to the recipient.

In the embodiment described above, prefixes for URLs of non-shared documents are predefined by the user. According to another embodiment, there may be some default prefixes set in the client device for specifying non-shared document. For example every link having the prefixes 'file://' and 'notes://' may be considered non-shared by default unless specified differently. These default prefixes may be used instead of or in addition to prefixes set by the sender.

According to this embodiment, once the client device detects the prefix of a URL as being that of a non-shared document, it may automatically convert the link to a form which recipients can access. Thus, in addition to or instead of providing a manual option to the sender to convert the link to a form, which recipients can access, the user's client device may also be provided with the capability for automatic conversion. If 'automatic conversion' is selected, the client device may automatically convert all the links pointing to non-shared document to an in-line document by converting the document into HTML format and embedding it in a multi part MIME message. This automatic conversion may be made evident to the sender, or it may occur without notification to the sender.

Though not illustrated, it should be appreciated that the email client devices and the methods described herein may be implemented on any suitable device, e.g., a personal computer. As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, or loaded into and/or executed by a computer, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

We claim:

1. A method for making non-shared linked documents within email messages accessible to a recipient, comprising:
   upon initiation of sending of an email message by a user, automatically parsing through the MIME to detect URL tags indicating that a linked document is contained within the email message,
   upon detection of a URL tag, checking a prefix of the URL tag to determine if the linked document is accessible to a recipient,
   if the prefix indicates that the linked document is not accessible to the recipient, providing for selection of at least sending the linked document as an in-line document by converting the document into HTML format and embedding it into a multi part MIME message; and
   if the sender is sending the email message with a linked Notes email and upon determining that the recipient of the email was originally a recipient of the Notes email, converting a Notes Universal ID of the linked Notes email to a MIME id of the Notes email, wherein the MIME id of the linked Notes email provides the recipient with access to the linked Notes email message.

2. The method of claim 1, further comprising providing for selection of an option of sending the message without converting the linked document.

3. The method of claim 1, further comprising providing for selection of an option of not sending the message.

4. The method of claim 1, further comprising providing for selection of an option of deleting the URL tag and sending the message.

5. The method of claim 1, wherein the user defines the prefixes of URLs for non-shared documents.

6. The method of claim 1, wherein if the prefix is set, by default, as not being accessible to the recipient, an option of converting the linked document into HTML format and embedding it into a multi part MIME message is automatically selected.

7. A computer program product for making non-shared linked documents in email messages accessible to recipients, comprising a computer readable storage medium storing computer program code, wherein the computer program code when executed on a computer, causes the computer to:
   upon initiation of sending of an email message by a user, automatically parse through the MIME to detect URL tags indicating that a linked document is contained within the email message,
   upon detection of a URL tag, check a prefix of the URL tag to determine if the linked document is accessible to a recipient,
   if the prefix indicates that the linked document is not accessible to the recipient, provide for selection of at least sending the linked document as an in-line document by converting the document into HTML format and embedding it into a multi part MIME message; and
   if the sender is sending the email message with a linked Notes email and upon determining that the recipient of the email was originally a recipient of the Notes email, converting a Notes Universal ID of the linked Notes email to a MIME id of the Notes email, wherein the MIME id of the linked Notes email provides the recipient with access to the linked Notes email message.

8. The computer program product of claim 7, wherein the computer readable medium further causes the computer to provide for selection of an option of sending the message without converting the linked document.

9. The computer program product of claim 7, wherein the computer readable medium further causes the computer to provide for selection of an option of not sending the message.

10. The computer program product of claim 7, wherein the computer readable medium further causes the computer to provide for selection of an option of deleting the URL tag and sending the message.

11. The computer program product of claim 7, wherein the user defines the prefixes of URLs for non-shared documents.

12. The computer program product of claim 7, wherein if the prefix is set, by default, as not being accessible to the recipient, the computer readable medium causes the computer to automatically select an option of converting the linked document into HTML format and embedding it into a multi part MIME message.

13. A user interface for use in making non-shared linked documents in email messages accessible to recipients, comprising:
   a user input for enabling a sender to compose an email message, wherein upon initiation of sending of the email message by the sender, the MIME of the email is automatically parsed through to detect URL tags indicating that a linked document is contained within the email message, and, upon detection of a URL tag, a prefix of the URL tag is checked to determine if the linked document is accessible to a recipient; and
   a display for providing the sender with the capability for selecting at least sending the linked document as an in-line document by converting the document into HTML format and embedding it into a multi part MIME message, the display further provides the sender with the capability for selecting an option of sending a Notes Universal ID of a linked Notes email with a MIME id of the Notes email if the sender was originally a recipient of the linked Notes email that is being sent.

14. The user interface of claim 13, wherein the display further provides the sender with the capability for selecting an option of sending the message without converting the linked document.

15. The user interface of claim 13, wherein the display further provides the sender with the capability for selecting options of not sending the message or deleting the URL tag and sending the message.

16. The user interface of claim 13, wherein the user defines the prefixes of URLs for non-shared documents.

17. The user interface of claim 13, wherein if the prefix is set, by default, as not being accessible to the recipient, an option of converting the linked document into HTML format and embedding it into a multi part MIME message is automatically selected.

* * * * *